United States Patent [19]
Radamaker

[11] 3,869,142
[45] Mar. 4, 1975

[54] VEHICLE SPRING ASSEMBLY AND METHOD OF CLAMPING SAME

[75] Inventor: George L. Radamaker, Warren, Mich.

[73] Assignee: Eaton Corporation, Cleveland, Ohio

[22] Filed: Oct. 23, 1973

[21] Appl. No.: 408,701

[52] U.S. Cl. .............................. 280/124 R, 267/47
[51] Int. Cl. ............................................... F16f 1/20
[58] Field of Search .................. 267/47, 48, 52, 53; 280/124

[56] References Cited
UNITED STATES PATENTS
| | | | |
|---|---|---|---|
| 1,741,162 | 12/1929 | McGowen | 267/48 |
| 2,527,453 | 10/1950 | Rowland | 267/47 |
| 2,993,690 | 7/1961 | Dafler | 267/47 |

Primary Examiner—Philip Goodman
Attorney, Agent, or Firm—Teagno & Toddy

[57] ABSTRACT

A leaf spring clamping device that substantially prevents flexing of the leaves in the region of attachment to the axle. This device utilizes an internal, rather than an external, clamping means to isolate this region. In one embodiment, the clamping means is composed of a tension bolt which passes through the leaf spring assembly and through spacer plates disposed on opposite sides of the spring assembly. The second embodiment utilizes conical washers adjacent the spring leaves.

8 Claims, 4 Drawing Figures

PATENTED MAR 4 1975   3,869,142

VEHICLE SPRING ASSEMBLY AND METHOD OF CLAMPING SAME

BACKGROUND OF THE INVENTION

Present installations of leaf springs on vehicles utilize an external means to attach the axle to the spring. The most common means of attachment is through the use of U-bolts and an axle mounting saddle. One of the inherent problems with this method of attachment is spring fracture in the region of axle attachment caused by spring flexing. Tests indicate that if spring flexing is not restricted in this region, premature spring failure is possible. The means used in present leaf spring installations to restrict flexing in this region is the axle attachment means, i.e., the mounting saddle, the backing plate, and the U-bolts. Sufficient clamping force cannot be applied through these means to sufficiently restrict spring flexing.

Another problem associated with the present method of axle attachment is that a resilient mounting saddle cannot be employed since such a resilient mount would cause increased spring flexing which, in turn, would result in an increase in the frequency of spring fracture. Since a resilient mount cannot be utilized, road noises and driveline vibrations are transferred to the vehicle which results in ride harshness.

Because of the aforementioned problems, it has become desirable to find a means to substantially prevent flexing of the spring leaves in the region of axle attachment which would also permit the use of a resilient axle mount.

SUMMARY OF THE INVENTION

The present invention provides a solution to the above-described problems of spring fracture and ride harshness by using a means other than the axle attaching means to substantially prevent spring flexing. In one embodiment of the invention, spacer plates are placed on opposite sides of the leaf spring assembly at the point where flexing is to be minimized; while in the other embodiment, conical washers are used adjacent the spring leaves. The holes in these plates or washers are aligned with holes in the leaf spring assembly, and fastening means, preferably a steel bolt, is inserted through the plates or washers. The fastening means is secured in a manner that provides a predetermined clamping force sufficient to substantially prevent spring flexing in the clamped region.

The present invention permits the use of a conventional method of axle attachment using a saddle and U-bolts. However, since the spring is clamped by internal means, a more resilient mounting means can be utilized for axle attachment, if desired.

DETAILED DESCRIPTION

Figure 1:
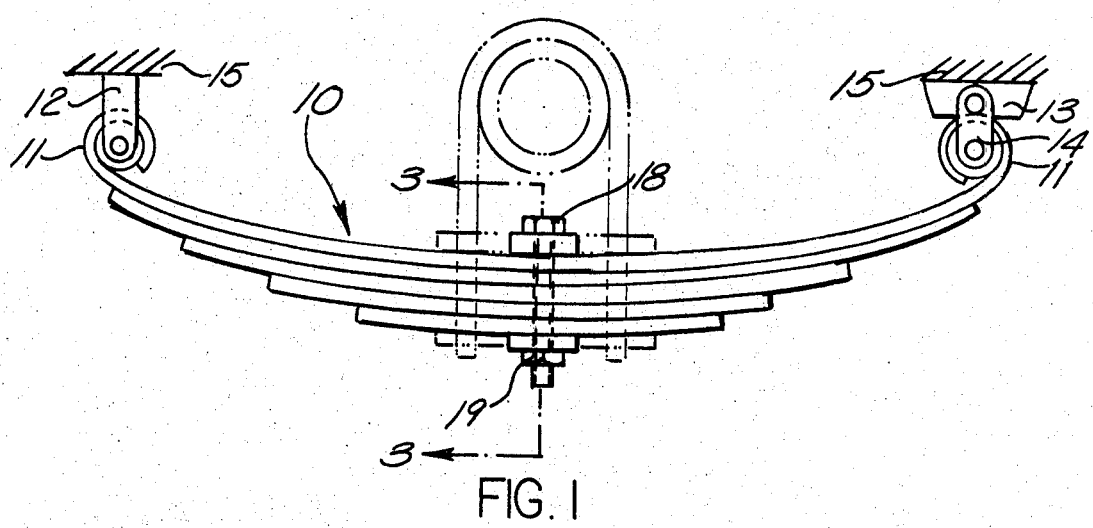
FIG. 1 is a side view of a leaf spring assembly with a plurality of leaves showing the installation of the leaf clamping device.
Figure 2:
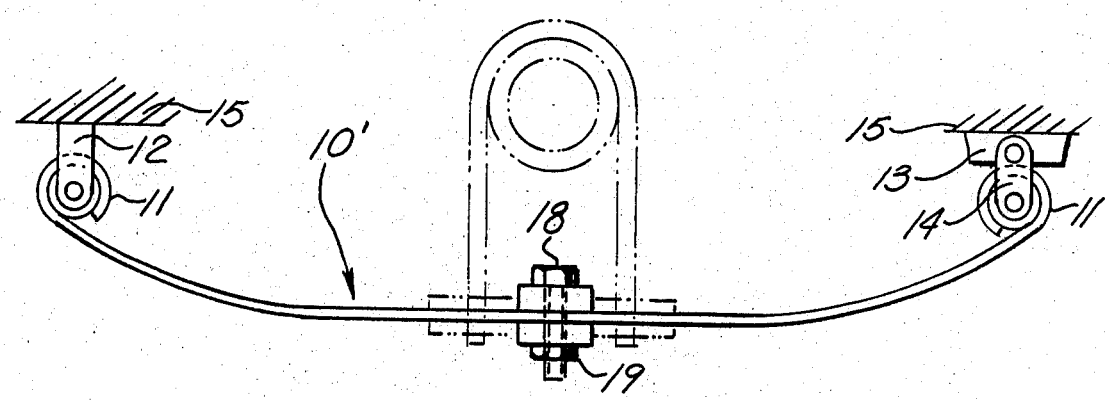
FIG. 2 is a side view similar to FIG. 1 of a single leaf spring assembly.

Referring now to FIGS. 1, and 2, the leaf spring assembly can have a form shown as 10 in FIG. 1 or 10' in FIG. 2. Referring to FIG. 1 spring assembly 10 has a plurality of spring leaves, whereas spring assembly 10' of FIG. 2 has a single leaf. Both spring assemblies 10 and 10' have an eye 11 provided at each end thereof, which eye 11 is adapted for attachment to vehicle frame members 15. Any convenient means may be used for attachment such as a bracket 12 or bracket 13 and spring shackle 14.

Figure 3:
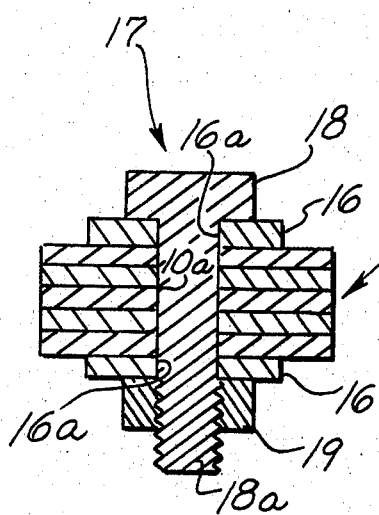
FIG. 3 is a sectional view taken along section-indicating lines 3—3 of FIG. 1 and shows the configuration of the embodiment of the leaf clamping device using spacer plates.

Referring now to FIGS. 1 and 3, the clamping means of the present invention is illustrated in greater detail. In the preferred form of the invention, the spring assembly 10 has an aperture 10a provided in the central region therein. Disposed on opposite sides of the spring assembly 10 are spacer plates 16. Each spacer plate has an aperture 16a provided therein. Fastening means 17 are received through the apertures 10a and 16a in order to provide the desired predetermined clamping force to the spacer plates 16, which in turn, apply the clamping force to the spring assembly 10. In the preferred practice of the invention, the fastening means 17 comprises a tension bolt 18 having a threaded portion 18a which is received through apertures 10a and 16a in the spring assembly 10 and spacer plates 16 respectively, and a nut 19 which engages the threaded portion 18a of bolt 18. The bolt 18 and nut 19 are tightened to a predetermined torque to produce the predetermined clamping force required.

Each spacer plate 16 should be of sufficient size so as to extend transversely the full width of the adjacent spring leaf and longitudinally for the distance for which it is desired to prevent spring flexing. The spacer plates 16 must be of sufficient stiffness to prevent flexing of the plate and to transmit the desired clamping force over the full contact area of the adjacent spring leaves. Such stiffness can be obtained by using hardened material or material of sufficient thickness. If desired, zinc interliners may be employed between the spacer plates 16 and the adjacent spring leaves and/or between the other spring leaves.

Figure 4:
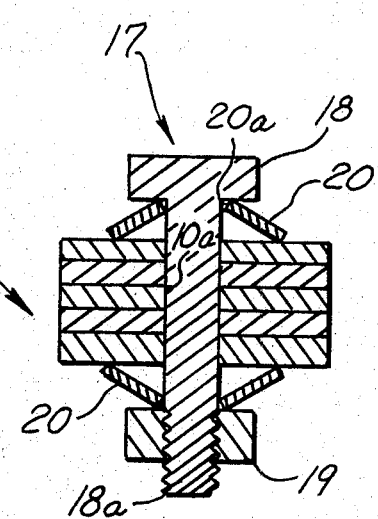
FIG. 4 is a sectional view similar to FIG. 3 and shows the configuration of the embodiment of the leaf clamping device using conical washers.

Another embodiment of the clamping means is illustrated in FIG. 4. In this embodiment, the spring assembly 10 has an aperture 10a provided in the central region therein. Disposed on opposite sides of the spring assembly 10 are conical washers 20 each having an aperture 20a provided therein. Fastening means 17 are received through the apertures 10a and 20a in order to provide the desired predetermined clamping force to the conical washers which, in turn, apply the clamping force to the spring assembly 10. As in the first embodiment, the preferred practice of the invention utilizes fastening means 17 comprising a tension bolt 18 having a threaded portion 18a which is received through apertures 10a and 20a in the spring assembly 10 and conical washers 20 respectively, and a nut 19 which engages the threaded portion 18a of bolt 18. The bolt 18 and nut 19 are tightened to a predetermined torque to produce the predetermined clamping force required.

Each conical washer 20 should be of sufficient size so as to extend radially for the distance for which it is desired to prevent spring flexing. The conical washers must be of sufficient stiffness to permit the tightening of the bolt 18 and nut 19 to the required torque without causing total flattening of the washers. Such stiffness can be obtained by using hardened material or material of sufficient thickness.

It should be obvious to those skilled in the art that although the fastening means 17 is shown as a bolt 18 and a nut 19, other fastener means, for example, a rivet, could be used.

Either embodiment of the clamping means, shown in FIGS. 3 and 4, can be used in a single leaf spring application, as illustrated in FIG. 2. Where a single leaf spring is employed, an aperture is provided in the central region of spring assembly 10'. As was previously described for a multiple leaf spring, either spacer plates 16, as shown in FIG. 3, or conical washers 20, as shown in FIG. 4, are then disposed on opposite side of leaf spring assembly 10' as previously described. Fastening means 17 are then received through apertures in either the spacer plates or conical washers depending upon which embodiment is employed, and through the aperture in spring assembly 10'. The preferred practice of the invention utilizes fastening means comprising a tension bolt 18 having a threaded portion 18a and a nut 19 which engages the threaded portion 18a of bolt 18. The bolt 18 and nut 19 are tightened to a predetermined torque to produce the predetermined clamping force required on the spring assembly 10'.

With either embodiment of the invention in either type of spring assembly, a conventional method of axle attachment, using an axle mounting saddle and U-bolts can be utilized as shown by the phantom outline in FIGS. 1 and 2. However, a resilient mounting saddle can be utilized since the spring assembly is clamped by internal means to substantially prevent flexing.

The present invention thus provides a clamping device which substantially prevents flexing of a vehicular leaf spring assembly in the region of axle attachment which is often the cause of spring failure. The present invention also permits the use of a resilient axle mounting saddle since spring flexing has been substantially prevented by the clamping device.

Variations of the present invention will be apparent to those having ordinary skill in the art and the invention is limited only by the spirit and scope of the following claims.

I claim:
1. A vehicular suspension assembly comprising:
   a. a plurality of spring leaves disposed in a stacked relationship and adapted for attachment to the vehicle at the ends thereof, each of said leaves having an aperture located in the central region thereof adapted for axle attachment, and
   b. clamping means operative to exert a clamping force on said leaves to substantially prevent flexing of said leaves for a predetermined length in the region adapted for axle attachment, said means including,
      i. plate means adjacent the outer of said spring leaves, said plate means being substantially non-flexible, and
      ii. tension means received through each of said apertures in said spring leaves, said tension means being operative to cause said plate means to exert said clamping force on said leaves.

2. An assembly as defined in claim 1, wherein said plate means adjacent the outer of said spring leaves includes washer means disposed on opposite sides of said assembly, and said means received through each of said apertures in said spring leaves includes fastening means.

3. An assembly as defined in claim 2, wherein said washer means includes at least one spacer plate disposed on each of the opposite sides of said assembly, each of said plates having one face thereof contacting the respective adjacent spring leaf.

4. An assembly as defined in claim 2, wherein said washer means includes at least one conically shaped washer disposed on each of the opposite sides of said assembly, each of said washers having its outer periphery contacting the respective adjacent spring leaf, said washers being resiliently deflectable by said tension means.

5. A vehicular suspension assembly comprising:
   a. a spring leaf adapted for attachment to the vehicle at the ends thereof, said leaf having an aperture located in the central region thereof adapted for axle attachment, and
   b. clamping means operative to exert a clamping force on said leaf to prevent flexing of said leaf for a predetermined length in the region adapted for axle attachment, said means including,
      i. plate means adjacent each opposite face of said spring leaf, and
      ii. tension means received through said aperture in said spring leaf, said tension means being operative to cause said plate means to exert said clamping force on said leaf.

6. An assembly as defined in claim 5, wherein said means adjacent each opposite face of said spring leaf includes washer means disposed on opposite sides of said assembly, and said means received through said aperture in said spring leaf includes fastening means.

7. An assembly as defined in claim 6, wherein said washer means includes at least one spacer plate disposed on each of the opposite faces of said spring leaf, each of said plates having one face thereof contacting the respective adjacent face of said spring leaf.

8. An assembly as defined in claim 6, wherein said washer means includes at least one conically shaped washer disposed on each of the opposite faces of said spring leaf, each of said washers having its outer periphery contacting the respective adjacent face of said spring leaf, said washer being resiliently deflectable by said tension means.

* * * * *